June 17, 1941.  W. A. JOHNSON  2,246,361
HARVESTER AND FEEDER
Original Filed July 22, 1938   3 Sheets-Sheet 3
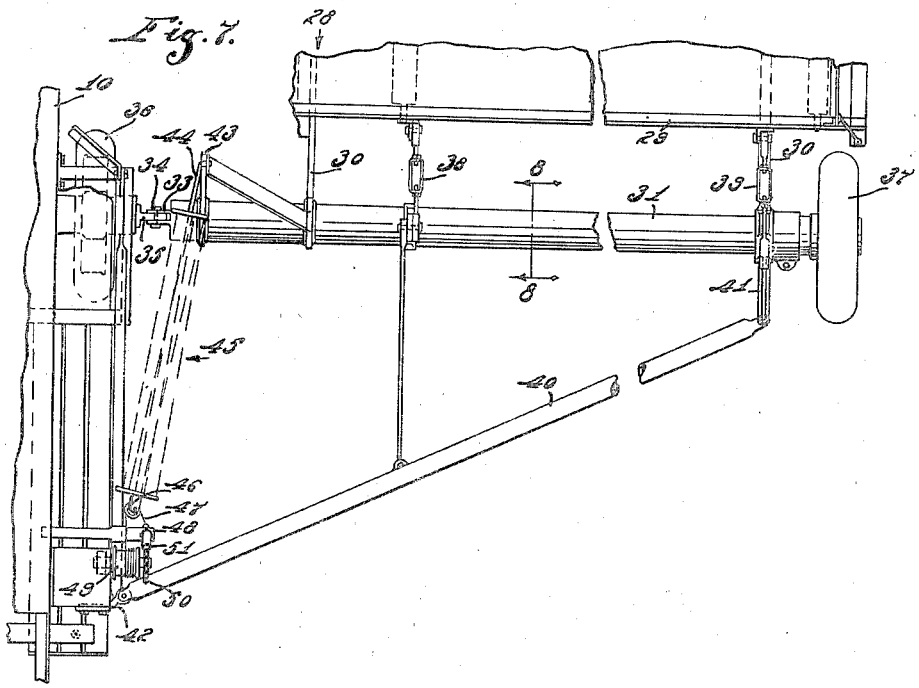
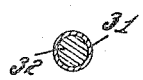
INVENTOR.
William A. Johnson,
BY
ATTORNEYS.

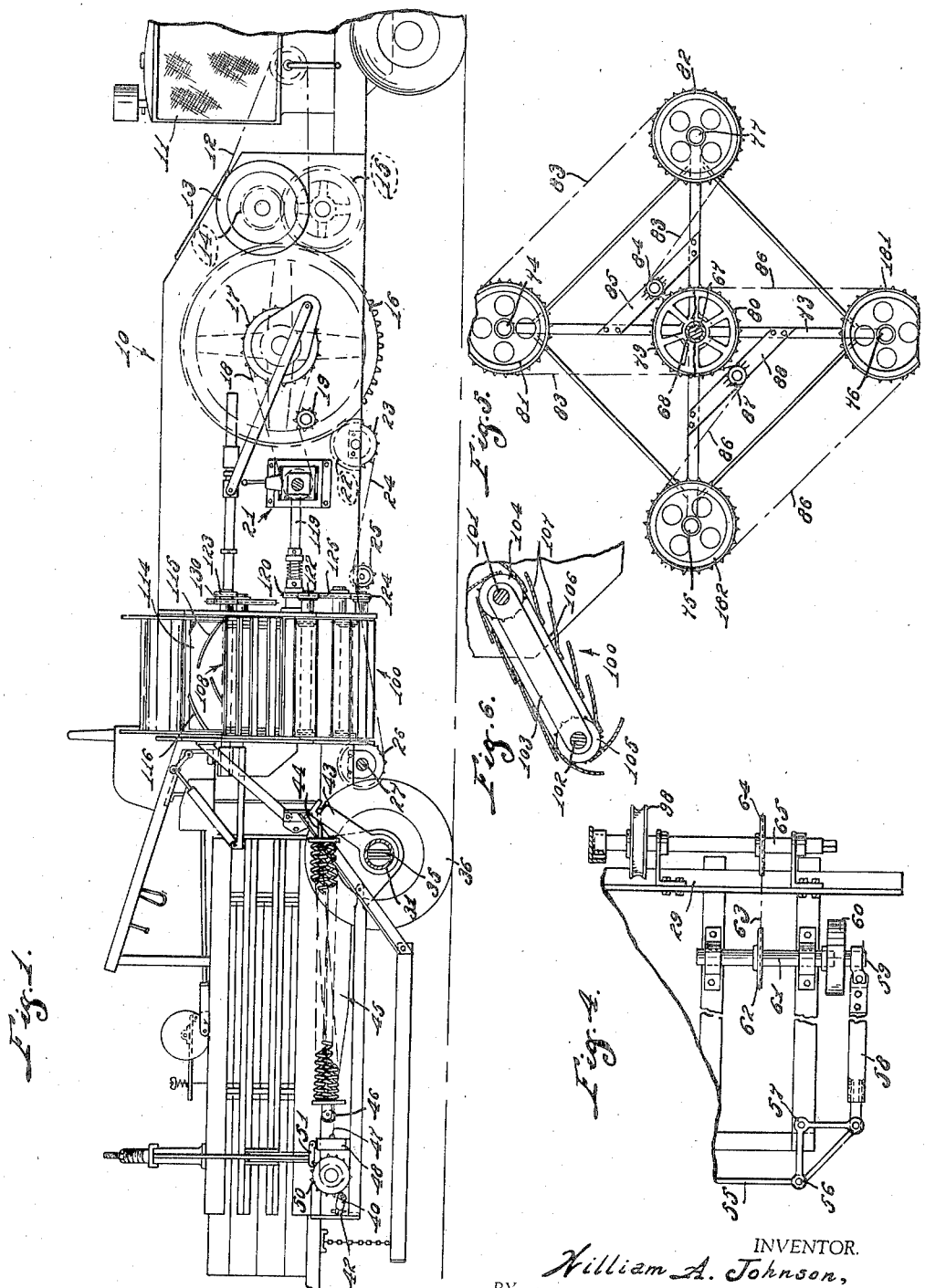

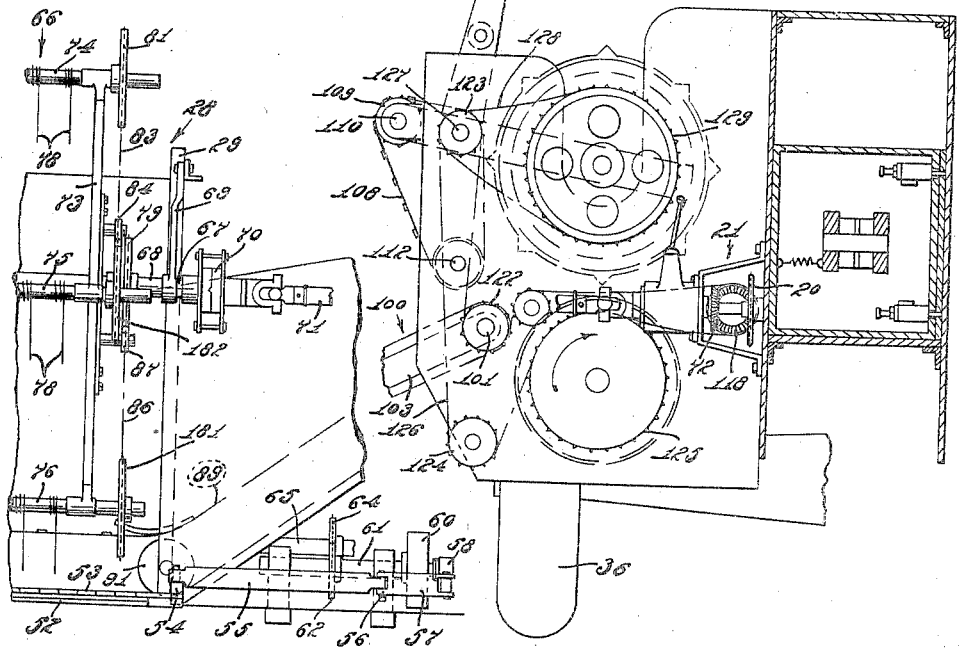

Patented June 17, 1941

2,246,361

UNITED STATES PATENT OFFICE 2,246,361

HARVESTER AND FEEDER

William A. Johnson, Springfield, Ill., assignor to The Ohio Cultivator Company, Bellevue, Ohio, a corporation of Ohio Original application July 22, 1938, Serial No. 220,621. Divided and this application May 2, 1940, Serial No. 333,008

1 Claim. (Cl. 56—23)

The present application relates to a harvester and feeder, and more particularly to harvesting and feeding means intended to be applied to, and used in connection with, a vehicle for carrying or operating upon the material to be harvested. Specifically, my invention is disclosed in association with a transit hay baler; and it is the primary object of the invention to provide means, associable with, and operating in conjunction with, a transit hay baler, for rapidly and effectively harvesting and gleaning the crop to be baled, and delivering the crop to the baling chamber of the machine with which the harvester and feeder is associated. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a side elevation of a hay baler with which the harvester and feeder may be associated, part of the feeding mechanism being shown is integrated with the baler;

Fig. 2 is an enlarged fragmentary view of the harvester and feeder, the feeding mechanism being shown in some detail;

Fig. 3 is a sectional view of the feeding mechanism, taken upon a plane parallel with, but spaced rearwardly from, the plane of Fig. 2;

Fig. 4 is a fragmental plan view of the drive mechanism for the mower;

Fig. 5 is a fragmental end elevation of the gathering reel and mechanism associated therewith;

Fig. 6 is a longitudinal section through one specific form of conveyor desirably used in the feeding mechanism;

Fig. 7 is a fragmental plan view, showing the manner in which the harvester and feeder is supported and associated with the vehicle; and Fig. 8 is a transverse sectional view taken upon the line 8—8 of Fig. 7.

Referring more particularly to the drawings, it will be seen that, in Fig. 1, I have illustrated a hay baler, or other vehicle, indicated generally by the reference numeral 10, and carrying a prime mover 11, which is connected by a belt 12, to drive a flywheel 13. The flywheel 13 is connected, preferably through a friction clutch, to drive a pinion 14 meshing with a gear 15, which, in turn, meshes with a bull wheel 16. Preferably, the pinion driven by the flywheel meshes with a gear on a shaft which carries two other gears respectively meshing with two identical bull wheels. Since, however, this gear train forms no part of the present invention, I have illustrated only the simple single train above described.

The shaft of the bull wheel 16 carries a sprocket 17 which, through a chain 18 running over a tensioning idler 19, drives a sprocket 20 (see Fig. 2) of a transmission 21. The bull wheel 16 meshes with a gear 22 connected to drive a sprocket 23 which, through a chain 24 running over a tensioning idler 25, drives the sprocket 26 on a shaft 27.

The harvesting mechanism of the present application is indicated generally by the reference numeral 28 in Figs. 2, 3, and 7; and comprises a frame 29 carried, by arms 30, upon a sleeve 31 journalled upon a dead axle 32 which is formed, at one end, with a fork 33 adapted to be pivotally connected, as at 34, to a bracket 35. The bracket 35 is mounted upon the vehicle 10 coaxial with the vehicle wheel 36, so that the axle 32 is substantially coaxial with the wheel 36, but is mounted for oscillation about an axis substantially parallel with the direction of travel of the vehicle, so that the ground wheel 37, supporting the outer end of the axle 32, may follow irregularities in the ground surface.

Adjustable-length links 38 and 39 further connect the frame 29 to the sleeve 31; and a brace 40 is connected at one end to a bracket 41 carried by the sleeve 31, and at its opposite end to a bracket 42 on the vehicle to assist in absorbing stresses in the direction of travel of the vehicle.

A lever 43, secured to the sleeve 31, projects upwardly therefrom; and a hook 44 connects one end of a spring assembly indicated generally by the reference numeral 45, with said lever. The opposite end of said spring assembly carries a pulley 46 through which is threaded a cable 47, one end of which is attached to a bracket 48 on the vehicle, and the other end of which is wrapped about the rotor or drum 49 of a winch carried by the vehicle. A ratchet 50 is fixed on said drum, and a pawl 51, mounted on the vehicle, cooperates with said ratchet to hold the drum 49 in any desired position of adjustment. Obviously, the winch 49 may be adjusted to increase or decrease the tension of the spring assembly 45.

Referring, now, to Fig. 2, it will be seen that I have illustrated a conventional mower comprising a shear plate 52 and a transversely reciprocable cutter arm 53 to which, as at 54, is connected one end of a link 55, the opposite end of said link being connected, as at 56, to one arm of a bell crank lever 57 (see Fig. 4). The other arm of said bell crank lever is connected by a pitman 58 with an eccentric stud 59 on a wheel 60 carried by a shaft 61 which likewise carries a sprocket 62 adapted to be driven, through chain 63, from a sprocket 64 mounted upon a shaft 65. Through suitable jointed means (not shown) the shaft 65 is connected to be driven by the shaft 27 (see Fig. 1).

A gathering reel, indicated generally by the reference numeral 66 in Fig. 2, is associated with the harvesting mechanism and comprises a main shaft 67 supported in bearings one of which is shown at 68 in Fig. 2. Said sleeve like bearings are supported, by hangers 69, from the frame 29 and are, of course, held against rotation. The shaft 67 is connected, through a flexible coupling 70 with a shaft 71 which is driven by the sprocket 20 and which carries the bevel gear 72 within the transmission 21.

The main shaft 67 carries a spider 73 in which are journalled a plurality (in the illustrated embodiment, four) of gathering shafts 74, 75, 76, and 77 (see Fig. 5). Each of said gathering shafts carries a plurality of picker fingers 78 which are adapted to urge material cut by the cutter bar 53 rearwardly onto a continuous belt conveyor 89 forming a part of the assembly 28. Desirably, the picker fingers 78 will be held against rotation about the axes of their associated gathering shafts; and I have provided means for so holding such fingers.

Upon the bearing 68 are mounted two sprockets 79 and 80 (see Fig. 5). These sprockets are provided with set screws, or the like, whereby they may be secured against movement with respect to the bearing 68; but it will be obvious that, when the set screws are loosened, the sprockets 79 and 80 may be individually or simultaneously adjusted as to their positions of rotation with respect to the bearing 68. During operation of the device, however, the sprockets 79 and 80 will remain immovable with respect to said bearing.

The gathering shaft 74 carries a sprocket 81 and the gathering shaft 77 carries a sprocket 82. Said sprockets 81 and 82 are connected, by a chain 83, with the sprocket 80; said chain running over the sprockets 80, 81, and 82, and over a tensioning sprocket 84 adjustably mounted upon a bar 85 carried by the spider 73. Similarly, the shaft 76 carries a sprocket 181 and the shaft 75 carries a sprocket 182, said sprockets 181 and 182 being connected to sprocket 79 by a chain 86 passing over the sprockets 79, 181, and 182 and over a tensioning sprocket 87 adjustably mounted on a bar 88 carried by the spider 73.

Obviously, all four sprockets 81, 82, 181, and 182 might be chain connected to a single stationary sprocket to accomplish the function of holding the picker fingers 78 against movement about the axes of their gathering shafts; but I have found that, where a single chain is so used, the respective gathering shafts sometimes get out of adjustment; and that uniformity is most easily provided with the mechanism herein illustrated in detail.

The conveyor 89 extends across the full length of the unit 28, material cut by the cutter bar 53 being deposited on the said conveyor 89 by the gathering reel 66. Said conveyor runs over a roller 90 and a roller 91, and over a roller (not shown) positioned at the opposite end of the unit 28. Adjacent the discharge end of the conveyor 89 there is positioned a short cooperating conveyor 92 which runs over rollers 93 and 94. The roller 94 is mounted upon a shaft 96 which carries a pulley 95 and an idler pulley coaxial therewith and therefore not shown. A belt 97 drives from the pulley 98 on the shaft 65 over the above-mentioned idler pulley, thence over the pulley 99 associated with the roller 90, and back over the pulley 95. Thus, if the shaft 65 is driven in a clockwise direction, as viewed from the right-hand end of Fig. 3, the pulley 99 will likewise be driven clockwise, as viewed in Fig. 3, and the pulley 95 will be driven counterclockwise.

Material is delivered from the conveyor 89 onto a conveyor carried by the vehicle, and indicated generally by the reference numeral 100. This conveyor is illustrated in detail in Fig. 6. It comprises a shaft 101 journalled in suitable supports on the vehicle, and a shaft 102 carried by links 103 adjustable about the axis of the shaft 101. Sprockets 104 on the shaft 101 and sprockets 105 on the shaft 102 carry two parallel endless bands 106 to which are secured a plurality of flexible aprons 107, preferably made of canvas or the like, said aprons being secured to the bands at their leading transverse edges and being free at their trailing transverse edges, the trailing transverse edge of each apron overlapping the leading transverse edge of the next succeeding apron. This particular structure has been found to be extremely efficient in the handling of straw, hay, alfalfa, and the like. A further conveyor 108 cooperates with the conveyor 100 adjacent the discharge end thereof, said conveyor being threaded over idler sprockets 109 and 111, respectively carried by shafts 110 and 112 and over a sprocket 127' carried upon a shaft 127 later to be described. Material is fed, by the conveyors 101 and 108, between a drum 113 and a drum 114. The drum 114 is mounted, as is clearly shown in Figs. 2 and 3, for floating movement about the axis of the shaft 127; and said drum is formed with a plurality of ribs on its peripheral surface. The ribs 115 of one series extend from the right-hand end of the drum rearwardly, as considered in connection with the direction of rotation of the drum, toward the median plane between the opposite ends of the drum. Similarly, the ribs 116 of the other series extend from the left-hand end of the drum rearwardly toward the median plane between the ends of the drum. Preferably, the ribs of one series are staggered peripherally with respect to the ribs of the other series.

The cooperative effect of the drums 113 and 114 is to force the material being handled to move across the table 128 to and through the inlet port 117 into the baling chamber of the illustrated machine; the material being guided in such movement by a shield 129 as shown in Fig. 3.

The transmission 21 includes a gear 118 meshing with the beveled gear 72, and carried upon a shaft 119 (see Fig. 1) which carries a sprocket 120. As is most clearly illustrated in Fig. 2, a chain 126 leads around the sprocket 120, under sprocket 122, on shaft 101, over sprocket 123 on shaft 127, under sprocket 124, and over sprocket 125 which is connected to the drum 113. The shaft 127 likewise carries a further sprocket 130 which, through chain 128, drives sprocket 129 carried by the drum 114.

This is a division of my application Ser. No. 220,621, filed July 22, 1938.

It will be understood that I desire to comprehend within my invention such modifications as come within the scope of the claim and the invention.

Having thus fully described my invention, what I claim as new and desire to secure by Letters Patent, is:

Harvesting means comprising a mower, drive means for operating said mower as the same is moved through a field, and a gathering reel associated with said mower, said reel comprising a main shaft, a plurality of radially spaced parallel gathering shafts carried thereby, picker fingers on each of said gathering shafts, means for driving said main shaft, a sprocket on each of said gathering shafts, a plurality of sprockets on said main shaft, a sprocket chain connecting a pair of adjacent sprockets to one of said sprockets on said main shaft, and a sprocket chain connecting another pair of adjacent sprockets to another of the sprockets on the main shaft, said last mentioned sprocket chain and pair of adjacent sprockets being out of alignment with said first mentioned sprocket chain and pair of adjacent sprockets, the said chains forming substantial triangles.

WILLIAM A. JOHNSON.